(12) United States Patent
Alacqua

(10) Patent No.: US 7,086,885 B2
(45) Date of Patent: Aug. 8, 2006

(54) SHAPE MEMORY ACTUATOR DEVICE

(75) Inventor: Stefano Alacqua, Rivoli Cascine Vica (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/025,136

(22) Filed: Dec. 30, 2004

(65) Prior Publication Data

US 2005/0260877 A1    Nov. 24, 2005

(30) Foreign Application Priority Data

May 21, 2004    (EP) ................................. 04425373

(51) Int. Cl.
*H01R 11/22*    (2006.01)

(52) U.S. Cl. ...................... 439/266; 439/161; 439/258; 439/488

(58) Field of Classification Search ................ 439/310, 439/266, 258, 269.1, 161, 188, 488; 310/307
See application file for complete search history.

(56) References Cited

U.S. PATENT DOCUMENTS 2,742,593 A * 4/1956 Voss ........................... 315/254
6,732,516 B1 * 5/2004 Butera et al. ................. 60/527
6,835,083 B1 * 12/2004 Alacqua et al. ............. 439/310
2004/0104580 A1   6/2004 Dirnberger et al.
2005/0062329 A1 * 3/2005 Alacqua et al. ........ 297/378.12

FOREIGN PATENT DOCUMENTS

| EP | 1 245 762 | 10/2002 |
|---|---|---|
| EP | 1 279 784 | 1/2003 |
| EP | 1 340 870 | 9/2003 |
| WO | WO 03/003137 | 1/2003 |

* cited by examiner

*Primary Examiner*—Briggitte Hammond
*Assistant Examiner*—X. Chung-Trans
(74) *Attorney, Agent, or Firm*—Nixon & Vanderhye P.C.

(57) ABSTRACT

A shape memory actuator device, comprising of a shape memory cable assembled through a sheath and susceptible of being supplied with an electric current to cause it to heat up. The sheath is placed in such a way to allow a manual activation of the controlled mechanism, acting as a transmission element, alternatively to the electric activation through the shape memory cable. Means are foreseen to detect the stop end position of the shape memory cable following its heating up in order to disconnect the electricity supply to such cable and to protect it from the risk of overheating. It is possible to foresee more shape memory cables placed parallel between them.

7 Claims, 3 Drawing Sheets

Figures 1, 2:
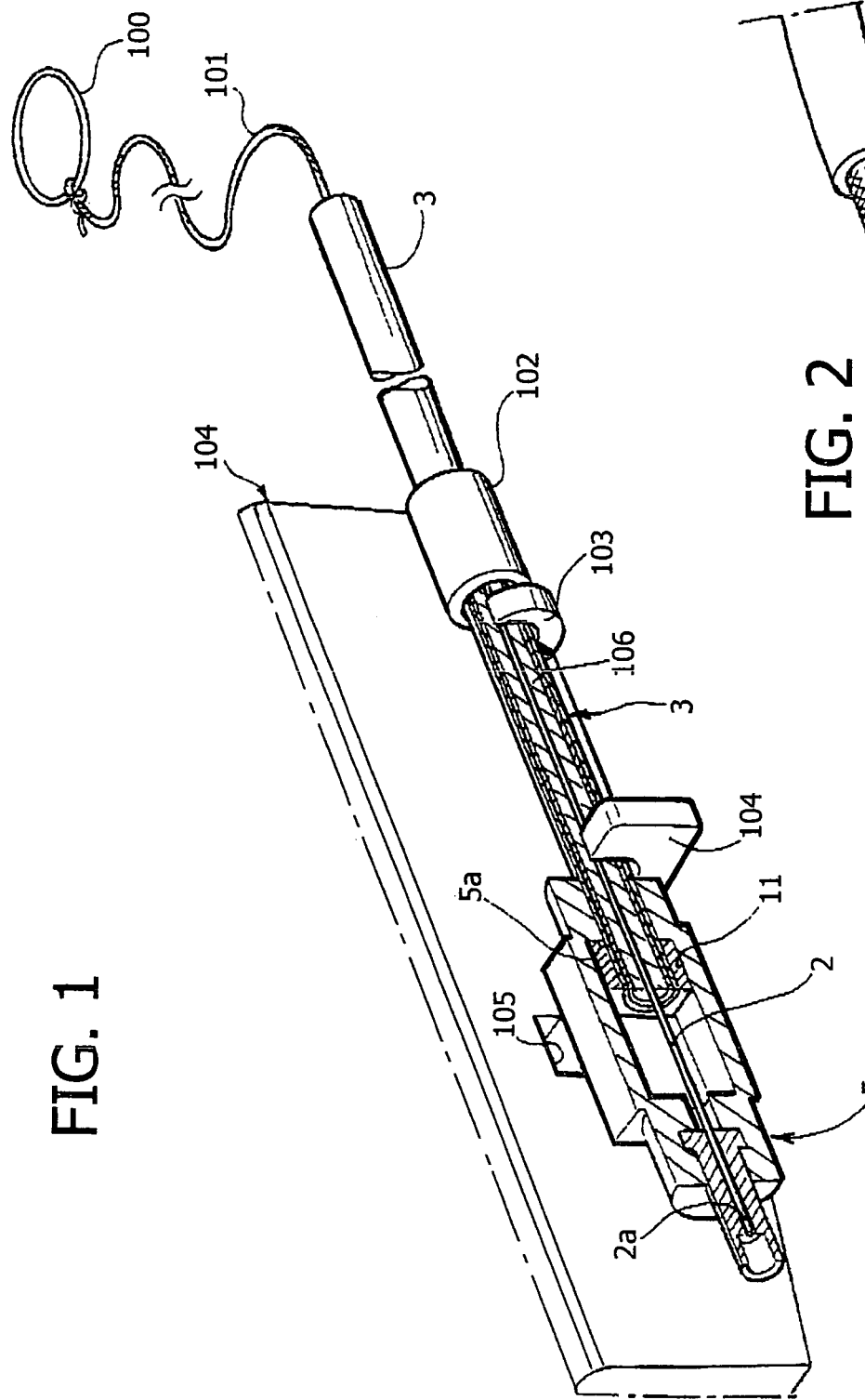

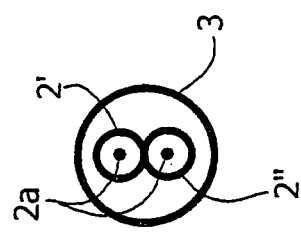
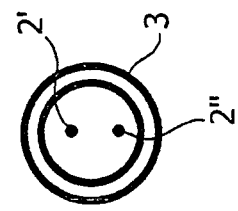
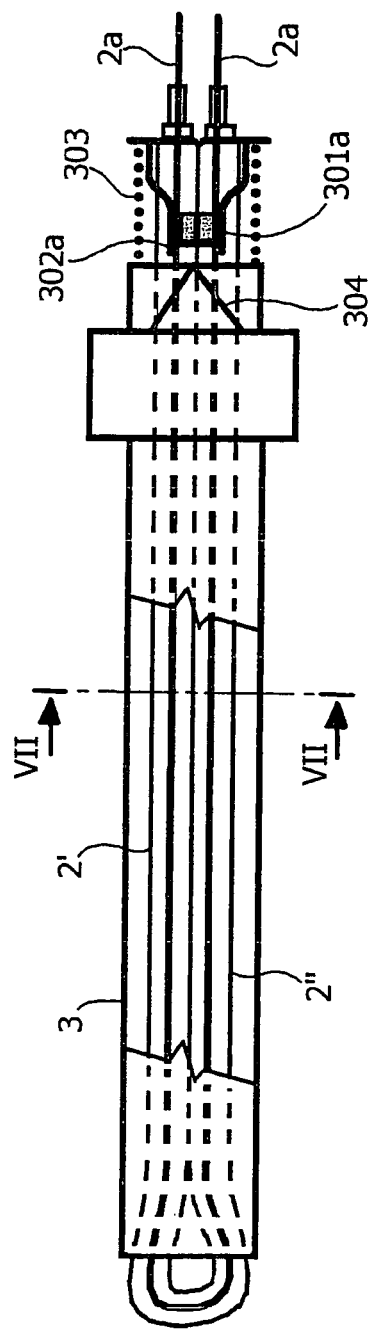
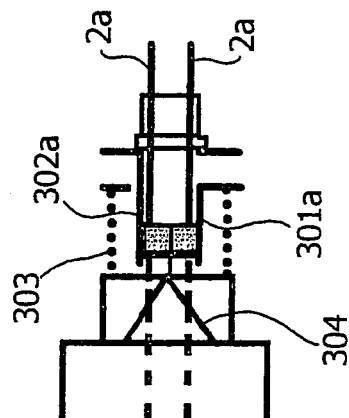
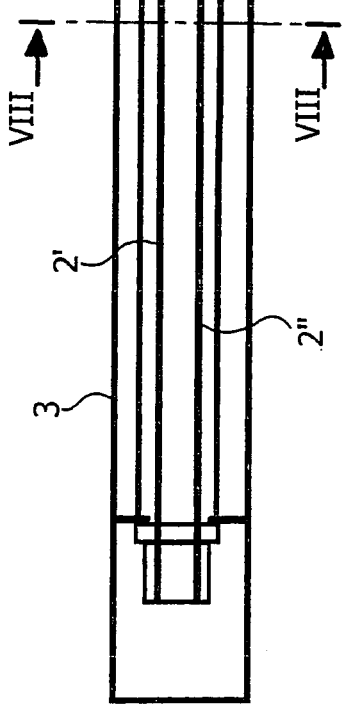

SHAPE MEMORY ACTUATOR DEVICE

SUMMARY OF THE INVENTION

The present invention relates to a shape memory actuator device, comprising of a cable, rigid or flexible, having an end connected to a controlled mechanism and a sheath inside which the cable is fitted, in which at least a portion of the cable is made up of a shape memory material, susceptible to undergo a shape change subsequent to its heating up, to operate the controlled mechanism, and in which it is also foreseen an electric supply circuit to feed through the shape memory cable an electric current in order to cause it to heat up.

A shape memory actuator device of a type described above has been proposed by the same applicant in WO03/003137 A1. An improvement of such device has also been the object of the claim of the European patent 03015862.0 always by the same applicant.

With the view of further improving the device previously submitted, the object of the present invention is a shape memory actuator device having all the characteristics which have been stated above and besides characterized in that it is provided with means suitable to detect a position of an end stop of the shape memory cable subsequent to its heating up and to cut off the electric supply to such cable following such detection.

Thanks to such a characteristic, the shape memory cable cannot be subject to excessive unnecessary heating up, after the controlled mechanism has already been brought to the desired operative position.

Preferably, the actuator according to the invention is of the type (known from WO03/003137 A1) in which said sheath is assembled in respect to a fixed support structure in such a way to be free to move longitudinally only in the direction to activate the controlled mechanism, and also in which the said sheath is coupled to the controlled mechanism in such a way to be able to transmit directly to it a movement in the aforesaid operative direction and to be uncoupled instead from the controlled element in respect to a movement in the direction opposite to the operative one, in such a way that said actuator is apt to be utilized either through a manual operation, using the sheath as an element of mechanical transmission, or by exploiting the shape change of the shape memory cable, obtainable through its heating up.

The actuator according to the invention finds several applications, one of which for example is constituted by the control of a door lock of a motor vehicle. In such an application, it is desirable to be able to operate the opening of the lock either electrically, or mechanically. Of course, with the opening of the lock is meant here the operation through which the lock is "unhooked" allowing the opening of the door and not the operation through which the locking block is removed in the closed condition. Thanks to the use of the actuator according to the invention, the unhooking of the lock can be executed either electrically, for example also through a remote control, or mechanically, acting on the door handle of the motor vehicle. A particular advantageous application is that of a lock of a bonnet or of a back hatch door of the motor vehicle, where it must be possible to operate either electrically or mechanically from the inside of the motor vehicle, in case that a person has remained inadvertently closed inside the motor vehicle. Thanks to the additional characteristics foreseen according to the invention, the shape memory cable being part of the actuator is protected from the risk of damaging by overheating.

Preferably, the said means apt to detect a position of the end stop of the shape memory cable are integrated in the actuator.

BRIEF DESCRIPTION OFF THE DRAWINGS

Figure 3:
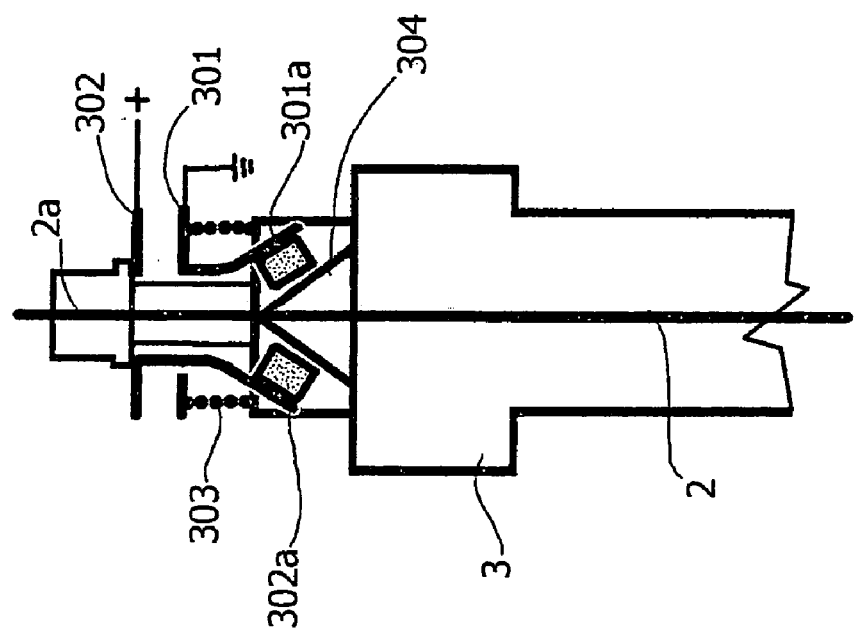
Figure 4:
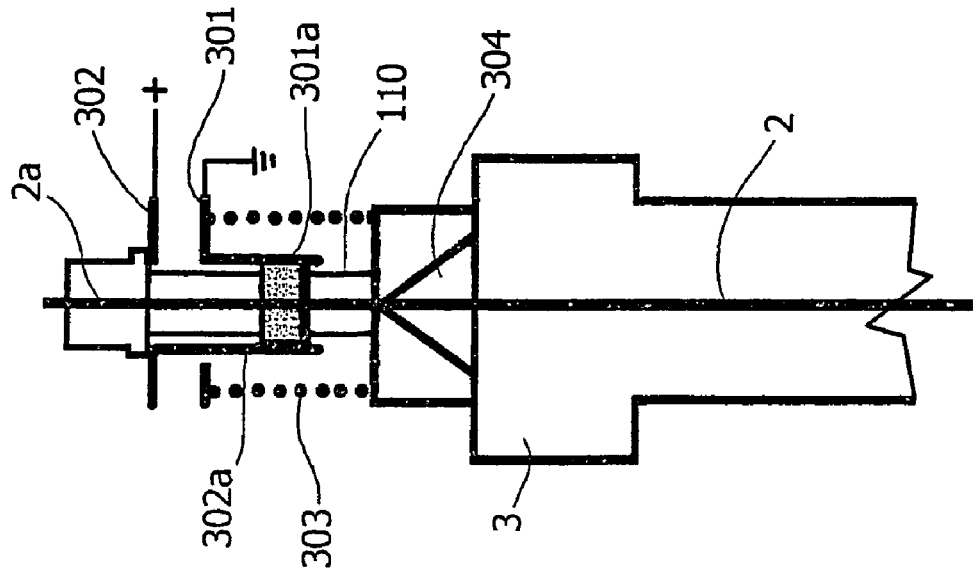

Further characteristics and advantages of the invention will result in the description which follows with reference to the enclosed drawings, supplied purely as a non limitative example, in which:

FIG. 1 is a perspective view partially cross sectioned of a form of realization of the actuator device previously proposed by the same applicant, corresponding to FIG. 5 of the international patent claim above identified, FIG. 2 is a perspective view partially cross sectioned of the shape memory cable being part of the actuator, according to the solution already proposed in the European patent claim also above identified, FIGS. 3, 4 show a detail of the actuator device according to the present invention in two different operative conditions, FIGS. 5, 6 are two cross section views of two variations of the actuator according to the invention, and FIGS. 7, 8 show two cross sections according to the lines VII and VIII of FIGS. 5, 6.

DETAILED DESCRIPTION OF THE INVENTION

With reference to FIG. 1, an example is here illustrated of an application of the actuator previously proposed to operate the lock of the bonnet or the back hatch door of the motor vehicle.

Regulations are foreseen that will compel the manufacturer to foresee the possibility to operate the lock manually from inside, to allow the opening of the hatch door to a person who might have accidentally been closed inside the motor vehicle. In the illustrated example, the actuator can be operated manually through a ring 100 which is connected through a cable 101 to the sheath 3 of a flexible cable actuator device. On the sheath 3 is secured a bushing 102 intended to come into contact against a fixed stop 103 being part of the structure 104 of the locking device of the hatch door. The cooperating action of the bushing 102 integral with the sheath 3 and of the end stop 103 prevents a movement of the sheath 3 in an opposite direction to the one of activation. Inside the sheath 3 is fitted a flexible cable 2 of memory shape material (let it be clearly understood that it is also possible to realize the device with a rigid cable instead of a flexible one) which is secured at an end 2a to a cylindrical body 5 which is in turn connected, through an opening 105 made in the wall of the casing of the lock 104, to the controlled mechanism of the lock (not illustrated). Means of electricity supply (not illustrated) are also foreseen to apply an electric tension to the two opposite ends of the shape memory cable 2, with the aim to cause it to shorten. When the actuator is operated manually acting on the ring 100, the mechanical traction is transmitted through the sheath 3 which is shifting towards the right (with reference to FIG. 1) causing a distancing of the bushing 102 from the fixed stop 103. The movement of the sheath 3 causes a corresponding movement of the cylindrical body 5, since at the extremity of the sheath 3 is fastened a ring 11 which is resting against an extremity surface 5a of an internal cavity of the cylindrical body 5. The movement of this last one causes in consequence an activation of the controlled mechanism, which, as already indicated, is connected to the cylindrical body 5 by a connection passing through the opening 105.

In the case, instead, of electric activation, the sheath 3 stand still, because it cannot move towards the left due to the resting of the bushing 102 against the fixed stop 103, while the shape memory cable 2 shortens, provoking a sliding of the cylinder 5 over the sheath 3 (by which the ring 11 distances itself from the resting surface 5*a*) and again an activation of the controlled mechanism.

The advantage in using the sheath of the actuator device as an element of mechanical transmission in the case of manual activation consists in the fact that in such a way it is possible to guarantee always the functioning of the device, even in the case of an accidental breakage of the flexible shape memory cable.

It is possible to observe that in the case of the previously proposed solution, illustrated in FIG. 1, between the cable 2 and the sheath 3 a distancing layer 106 of synthetic material is interposed which is united to the sheath 3 and is integral with it. Such a layer has only a distancing function, so that during the functioning of the device, a relative movement is created of the flexible cable in respect to it.

In the case of the solution, also already proposed, illustrated in FIG. 2, instead, a structure of a different type is associated to the flexible cable. Also in this case between the flexible cable 2 of the shape memory material and the relative flexible sheath 3, a distancing layer 106 is foreseen, which in the illustrated case is constituted of a braided wire.

The difference in respect to the solution illustrated in the FIG. 1 lies in the fact that in this case over the cable of shape memory material 2 is moulded a coating layer 110 that adheres to the shape memory cable 2 and is selected in elastomer/silicone or synthetic materials so that it facilitates either the cooling of the cable 2 after the switch off of the current, or the return of the cable 2 in its resting configuration, due to the effect of the elastic return of the coating 110.

Preferably the coating 110 is moulded on top of the cable 2 through an operation of simultaneous extrusion of the material constituting cable 2 and by the coating 110. In other words, during the production process, the cable 2 and the relative coating 110 are obtained simultaneously, through a process of co-extrusion, which presents the advantage to obtain the desired structure with a single operation, without the necessity of additional assembly operations.

The coating 110, which is adherent to the cable 2, performs the function of a spring distributed longitudinally, which is subjected to compression when the cable 2 shortens following its activation and consequently facilitates the return of the cable to the resting position through its elastic return.

The shape memory cable could be of any configuration. Besides it is possible to co-extrude several shape memory cables inside the same coating. A configuration of the cable as a U is of particular interest, with a forward tract and a return tract and the two extremities of the cable adjacent between them, which amongst other things gives the advantage of an easy electrical connection of the cable to the electricity supply means.

In the FIGS. 3–8, the common parts to those of FIGS. 1, 2 are indicated by the same reference number. With reference in particular to FIGS. 3, 4 inside the body 5 (FIG. 1) which is connected rigidly to the terminal end 2*a* of the shape memory cable 2, two metallic terminals 301, 302 are predisposed which are connected respectively to the earth and to the positive pole in the electric supply circuit of the shape memory cable 2. The two terminals 301, 302 present two overhanging placed lamellae 301*a*, 302*a*, electrically deformable by flexing, which are normally in contact between them, assuring the continuity of the electric connection of the shape memory cable 2 to the electric supply means. The base portions of the terminals 301, 302 are securely fixed inside the body 5. Furthermore a coil spring 303 is coaxially placed around the cable 2 inside the cavity of the body 5, between the base part of the terminal 301 and the extremity of the sheath 3 and of the relative support 11. To such support a pointed appendix 304 is solidly integrated.

FIG. 3 shows the configuration of the device in the resting position. When the actuator is activated through an electric supply to the shape memory cable 2, the end terminal 2*a* of the cable 2 lowers itself (with reference to FIGS. 3, 4) in respect to the terminal portion of the sheath 3 until it reaches the position of end stop illustrated in FIG. 4. In such position the pointed appendix 304 penetrates between the two lamellae 301*a*, 302*a* of the terminals 301, 302 opening them wide and separating them one from the other so to disconnect the continuity of the supply circuit of the cable 2. The electricity supply of the cable is therefore disconnected, protecting such cable from the risk of overheating. In the case for example of the application to the opening of the lock of a bonnet or a back hatch door of a motor vehicle, it so prevents the cable becoming damaged by excessive heat, which becomes totally unnecessary once the opening of the lock has been obtained. Naturally, the activation of the shape memory cable 2 provokes the movement above described against the action of the spring 303, which provides the return of the device to the rest position when the power supply is disconnected.

FIGS. 5, 7 show the solution already mentioned above where the same cable 2 is sent back at U so to present two branches parallel between them 2', 2" secured to the body 5 corresponding to their two end terminals 2*a*, adjacent between them. The whole of the two branches 2', 2" is contained inside the same sheath 3.

FIGS. 6, 8 show a further variation that always foresees two shape memory wires 2', 2" parallel between them, which in this case however are two wires separated one from the other, contained inside the same sheath 3 and secured at the extremities 2*a* to the body 5 (not illustrated).

In both cases shown in FIGS. 5, 7 and 6, 8, the disposition of the terminals 301, 302 and the pointed appendix 304 is analogous to that already described with reference to FIGS. 3, 4.

Naturally, keeping firm the principle of the invention, the particulars of the construction and the forms of realization could extensively change in regard to what has been described and illustrated only as an example, without leaving from the present invention.

What is claimed is:

1. Actuator device comprising:
   a cable having an extremity connected to a controlled element,
   a sheath with an inside which is fitted to the cable,
   wherein at least a portion of the cable comprises a shape memory material, susceptible of undergoing a shape variation as a result of heating up, in order to operate the controlled element,
   an electric supply circuit to run an electric current through the cable in order to cause it to heat up,
   wherein said actuator device is provided with means to detect a position of end stop of the cable following its activation and to consequently disconnect an electric supply to said cable.

2. Actuator device according to claim 1, wherein:
   said sheath is free to move longitudinally only in an operative direction of the controlled element, and said sheath is coupled to the controlled element in such a way to be able to transmit directly to it a movement in the aforesaid operative direction and instead to be uncoupled from the controlled element when moving in an opposite direction to the operative direction, and wherein said actuator is capable of being utilized either through a manual operation, using the sheath as an element of mechanical transmission, or by exploiting the shape variation of the shape memory cable obtainable through its heating up.

3. Actuator device according to claim 1, wherein said means comprises two electric terminals, and a spacing element between said terminals separating them from each other, so as to disconnect the electric supply from the shape memory cable when said cable reaches a stop end position following its heating up.

4. Actuator device according to claim 3, wherein said spacing element is carried by a body connected rigidly to an extremity of said sheath, while said electric terminals are carried by a body connected rigidly to an end terminal of the shape memory cable.

5. Actuator device according to claim 1, wherein it comprises a plurality of cables or shape memory wires in parallel.

6. Actuator device according to claim 5, wherein it comprises a pair of branches of shape memory wire in parallel, defined by a single wire in a U configuration.

7. Actuator device according to claim 1, wherein said means are integrated in the actuator.

* * * * *